Sept. 2, 1969   J. C. ABROMAVAGE ET AL   3,464,720
SAFETY CHAIN LOCKING CLASP

Filed Oct. 9, 1967   2 Sheets-Sheet 2

INVENTORS
JOHN C. ABROMAVAGE
EDWARD A. FRADER

BY Semmes & Semmes

ATTORNEYS

United States Patent Office 3,464,720
Patented Sept. 2, 1969

3,464,720
SAFETY CHAIN LOCKING CLASP
John C. Abromavage, Tempe, and Edward A. Frader, Phoenix, Ariz., assignors to Arcoa, Incorporated, Portland, Oreg., a corporation of Oregon
Filed Oct. 9, 1967, Ser. No. 673,898
Int. Cl. B60d 1/12, 1/14
U.S. Cl. 280—457                                    3 Claims

ABSTRACT OF THE DISCLOSURE

Automobile safety or towing chain locking devices, particularly a safety chain clasp adapted for positive securement to a towing vehicle frame.

BACKGROUND OF THE INVENTION

Field of the invention

Automobile tow chains generally have a grab-hook at one end, the grab-hook being adapted for hooking or clasping a surface of the towing automobile frame or hooking onto the chain after the chain has encircled the frame member. An unsolved problem in the conventional grab-hook is that positive locking is not provided. For example, upon release of tension in the chain the grab-hook may easily slip by gravity or by jarring so as to fall apart from the auto frame surface or the chain link which it engages.

A number of inventors have attempted to overcome this shortcoming by providing especially configured chain link slots or slots with resilient means for securing the chain link or clasping hook.

Description of the prior art

Unger (1,496,793) and Winter (1,850,367) are typical of the tailgate locking art, Unger's chain being inserted in various types of slots having resilient holding mechanisms and Winter's tailgate chain having a grab-hook 18 on its end.

Tiffany (2,985,476) although concerned with livestock gates does suggest the expedient of employing a T-shaped hook and slot. Tiffany's hook is secured stationarily by means of plate 11 to the gate post and its slot is attached as a movable member to the end of the chain. There is no suggestion of positive locking through a combination of abutting surfaces on the locking pin.

Safford (3,072,419) shows conventional use of safety chain grab-hooks engaging the auto frame of the towing vehicle.

Snuggins (3,125,355) features the employment of the chain end and slot combination in auto safety chains. De Puydt (3,132,878) employs a cross chain, slot-anchored.

SUMMARY OF THE INVENTION

According to the present invention, a chain clasping mechanism includes a pin insertable through the towing auto frame and lockable therein so that either the weight of the chain secures the pin in place or in another attitude a portion of the pin extending through the frame is complementally engaged by an ancillary grab-hook. As a result, there is provided in either attitude a positive locking of the chain to the frame. The actual locking pin consists of a *shank* which is secured at its mid-portion to a chain link, a *clasping portion* extending substantially perpendicularly from the shank and which includes a T-head presenting a grabbing surface parallely offset with respect to said shank and adapted for locking abutment with a surface of the auto frame, and at the other end of the shank a slide surface recess for securing a grab-hook. A grab-hook is attached independently to the safety chain by means of an ancillary chain. The grab-hook circumferentially engages the slide surface recess as it extends through the auto frame and simultaneously abuts the auto frame. Thus, the combination of the abutment of the T-head and frame at one end of the shank and the abutment of grab-hook and frame at the other end of the shank positively secures the clasp to the frame.

DESCRIPTION OF THE PREFERRED EMBODIMENTS

Figure 1:
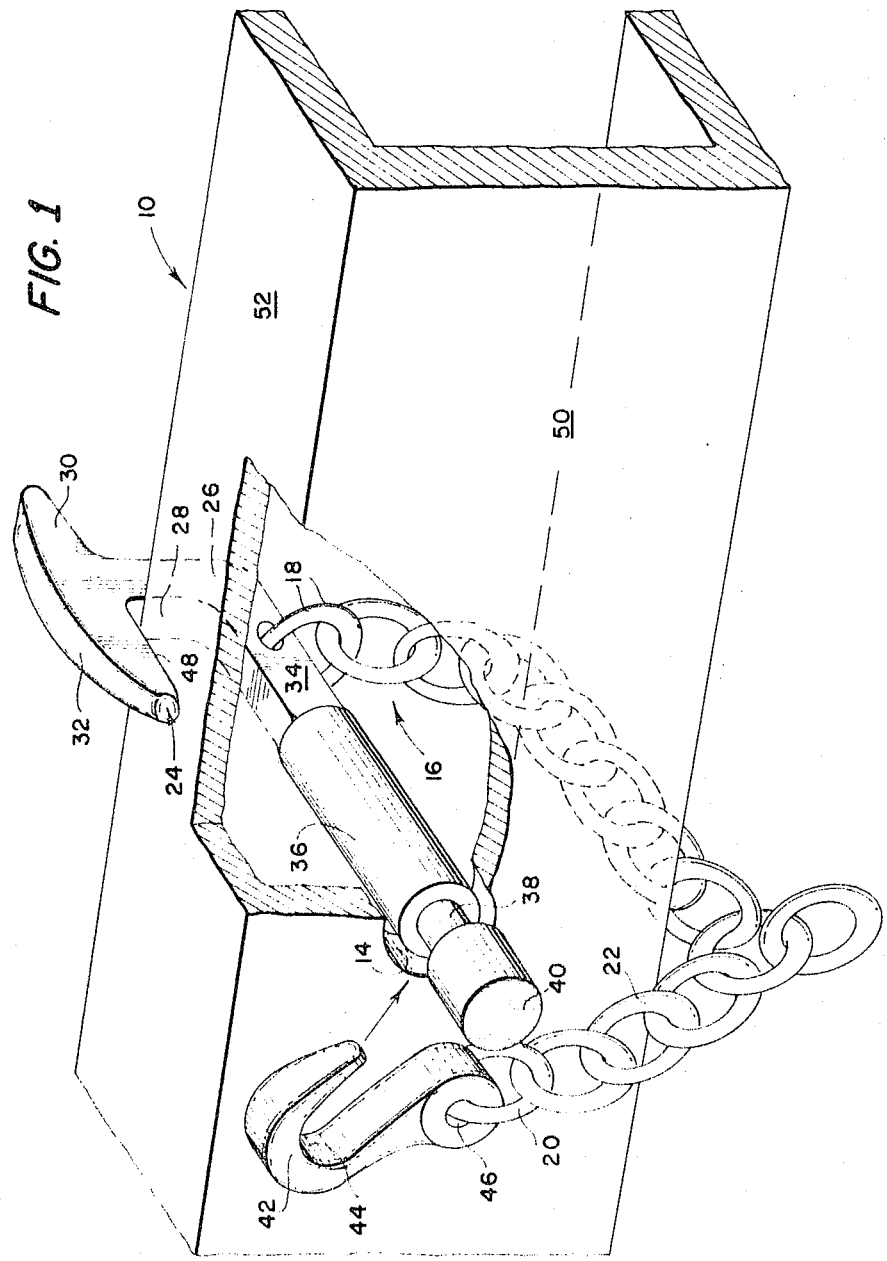
FIG. 1 is a fragmentary perspective, partially exploded, showing the chain locking pin extending through a hole in the auto frame for complemental engagement with the grab-hook, while the T-head grabbing surface abuts the top of the auto frame.

In FIG. 1 auto frame 10 is illustrated as having a circular aperture or hole 14 cut therein so that a towing chain, generally designated as 16, locking pin shank rounded end 40 is insertable therethrough. Locking pin 24 is indicated as comprised of flattened shank or midportion 34 secured to chain link 18, a rounded elbow 26, a perpendicularly extending neck 28, and a T-shaped head 30 having an arcuate top 32. At its other end locking pin 24 has rounded shank 36 and slide surface recess 38 adjacent rounded end 40.

As illustrated in FIG. 1, rounded end 40 and chain slide surface 38 are presented coaxially of hole 14, while T-head lower grabbing surfaces 48 abut top 52 of the auto frame. An ancillary locking chain 22 may have a conventional grab-hook 42 secured to its final link 20 by means of eye 46. Grab-hook bent portion 44 circumferentially engages slide surface 36 which locks the grab-hook 42 against longitudinal movement with respect to shank 36. The combination of abutment of grab-hook 42 side against the frame or channel side 50 and the abutment of T-head flat surface 48 against the frame top 52 provides positive locking of the clasp and the chain end with respect to the frame.

Figure 2:
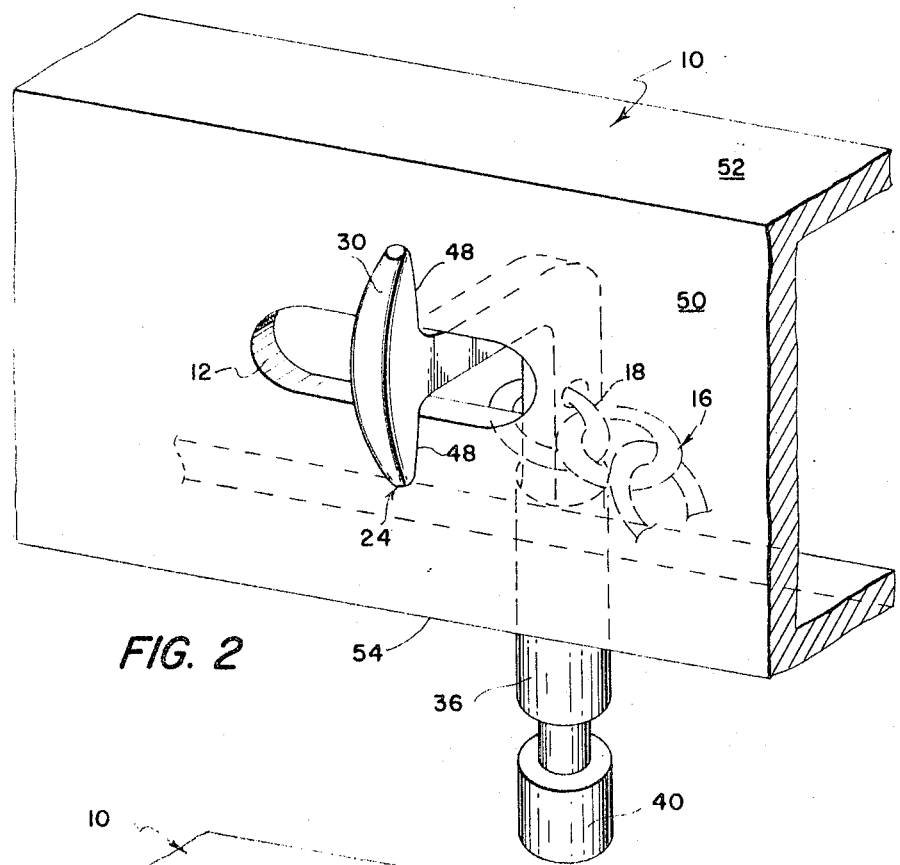
FIG. 2 is a modification of the invention, showing securement of the T-shaped locking head in a slot cut within an auto frame, the weight of the chain on the T-head providing positive locking, while the T-head overlaps the slot sides.
Figure 3:
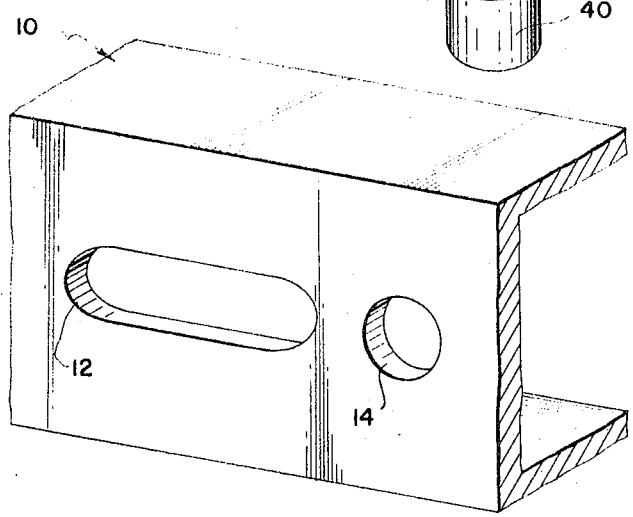
FIG. 3 is a fragmentary perspective showing the employment of slots or holes adapted, respectively, for positioning of the locking pin T-head or rounded portion.

In FIG. 2 a modification of invention is illustrated, wherein T-head 30 in its horizontal position is insertable through a conventional slot 12 in auto frame 10. As T-head 30 is rotated to its vertical position, the grabbing flat surfaces 48 extend over either side of slot 12 while the rounded shank 36 is presented downwardly. The weight of chain 16 bearing upon locking pin 24 secures the T-head surfaces 48 in a position of abutment straddling slot 12, thus providing positive locking. Also, according to this modification of invention and depending upon the dimensions of frame 10, the grab-hook may be inserted at the bottom 54 of the auto frame and provide a positive locking.

Manifestly, the locking pin may be variously machined and various types of grab-hooks may be employed without departing from the spirit and scope of invention.

We claim:

1. In combination with a safety chain, a safety chain locking clasp therefor of the type having a plurality of interconnecting links, said clasp including:

(A) a locking pin attachable at its shank portion to a link at one end of said chain and having:

(i) a clasping portion extending substantially perpendicularly from one end of said shank and including a T-head presenting a grabbing surface parallely offset with respect to said shank; and (ii) a rounded portion at the other end of said shank and including a slide surface recess;

(B) a grab hook independently attached to a chain link spaced from said chain end, said hook adapted to circumferentially engage said slide surface and to be secured thereby against movement longitudinally of said shank.

2. In combination with a vehicle towing channel-shaped frame and a safety chain of the type having a plurality of interconnecting links, a safety chain locking clasp including:

(A) a locking pin attachable at its shank portion to one end of said chain and having:

(i) a clasping portion extending substantially perpendicularly from one end of said shank and including a T-head presenting a grabbing surface parallely offset with respect to said shank, said shank being adapted to extend through a hole cut in the frame web while the grabbing surface extends over and abuts a flange of said frame; and (ii) a rounded portion at the other end of said shank and including a slide surface recess;

(B) a grab hook independently attached to a chain link spaced from said chain end, said hook circumferentially engaging said slide surface and being secured thereby against movement longitudinally of said shank to act as a stop while abutting the frame web.

3. A safety chain locking clasp as in claim 2, said shank being dimensioned with respect to said frame so that while said grabbing surface abuts the flange of said frame, said grab-hook while secured in slide surface recess abuts the frame web so as to fix said locking clasp and said safety chain upon said frame.

References Cited
UNITED STATES PATENTS

| | | |
|---|---|---|
| 1,302,470 | 4/1919 | Krug. |
| 1,314,737 | 9/1919 | Everhart. |
| 2,322,576 | 6/1943 | Huebshman et al. ____ 24—230.5 |
| 3,084,970 | 4/1963 | Day. |
| 3,215,390 | 11/1965 | De Shetler. |
| 3,328,064 | 6/1967 | Simon. |

LEO FRIAGLIA, Primary Examiner

U.S. Cl. X.R.

280—480, 500, 505; 24—230.5; 296—1